United States Patent [19]

Cizek

[11] Patent Number: 4,997,040

[45] Date of Patent: Mar. 5, 1991

[54] CORROSION INHIBITION USING MERCURY INTENSIFIERS

[75] Inventor: Arthur Cizek, Houston, Tex.

[73] Assignee: Baker Hughes Incorporated, Houston, Tex.

[21] Appl. No.: 422,463

[22] Filed: Oct. 17, 1989

[51] Int. Cl.$^5$ .................... E21B 41/02; E21B 43/27
[52] U.S. Cl. .................... 166/307; 134/41; 166/242; 166/902; 252/8.553; 252/8.555; 252/389.53; 427/239
[58] Field of Search ............ 166/242, 271, 300, 307, 166/312, 902; 252/8.553, 8.555, 176, 389.53; 134/3, 28, 41, 42; 427/239

[56] References Cited

U.S. PATENT DOCUMENTS

| | | | |
|---|---|---|---|
| 2,405,672 | 8/1946 | Reitmeier | 252/186.1 X |
| 2,982,360 | 5/1961 | Morton et al. | 166/902 X |
| 3,463,733 | 8/1969 | Achenbach | 134/41 X |
| 3,773,465 | 11/1973 | Keeney et al. | |
| 3,880,585 | 4/1975 | Hess et al. | |
| 3,951,844 | 4/1976 | Mago | 252/389.54 X |
| 3,954,636 | 5/1976 | Crowe et al. | 166/307 X |
| 4,004,055 | 1/1977 | Hess et al. | 427/431 |
| 4,111,830 | 9/1978 | Bannister | 422/17 |
| 4,440,731 | 4/1984 | Pearce | 252/389.53 X |
| 4,498,997 | 2/1985 | Walker | 252/389.54 |
| 4,552,672 | 11/1985 | Walker | 252/8.553 |
| 4,670,163 | 6/1987 | Linstrom et al. | 252/8.555 |
| 4,683,954 | 8/1987 | Walker et al. | 166/307 |
| 4,871,024 | 10/1989 | Cizek | 166/307 |

FOREIGN PATENT DOCUMENTS 2743596  4/1979  Fed. Rep. of Germany ............ 252/389.53

OTHER PUBLICATIONS

P. A. Burke et al., "Corrosion of Chromium Steels in Inhibited Acids," *Corrosion*/87, Paper No. 41, National Association of Corrosion Engineers, San Francisco, Calif., 1987.

M. L. Walker et al., "Inhibition of High Alloy Tubulars II: Effect of Fluoride Ion and Acid Strength," *Corrosion*/88, Paper No. 189, National Association of Corrosion Engineers, St. Louis, Mo., 1988.

*Primary Examiner*—George A. Suchfield
*Attorney, Agent, or Firm*—Rosenblatt & Associates

[57] ABSTRACT

An acid soluble mercury metal salt intensifier is provided to inhibit corrosion in conjunction with a corrosion inhibitor when a steel surface is present in an acid environment. The mercury metal salt may be a mercuric halide, such as mercuric chloride or may be a mercuric acetate, mercuric oxide, mercuric nitrate or mixtures of all of these. An acid soluble copper metal salt, such as cuprous halide, for example, cuprous chloride, copper acetate, cupric formate, cuprous nitrate and mixtures thereof, may also be present as a co-intensifier. In one application, the mercuric salt intensifier is used in a fluid for treatment of a subterranean well for the acid enhancement of production within the well by introduction of the fluid through a high alloy steel conduit positioned within the well. Methods of inhibiting acidic corrosion when steel surfaces are in an acid environment, particularly steel surfaces containing chrome, and methods of treating a subterranean well for enhanced production are also presented.

40 Claims, No Drawings

CORROSION INHIBITION USING MERCURY INTENSIFIERS

CROSS-REFERENCE TO RELATED APPLICATION

This application is related to U.S. Pat. No. 4,871,024; which pertains to fluids containing a soluble copper metal salt for treatment of subterranean wells for the enhancement of production therefrom.

FIELD OF THE INVENTION

The invention relates to methods for the prevention of the corrosion of steels exposed to acid environments, and in one aspect, more particularly relates to chemical additives that might be employed in the acid medium to inhibit the corrosion of steel surfaces in contact therewith.

BACKGROUND OF THE INVENTION

It is well known that steel surfaces will corrode in the presence of acid environments. While the rate at which corrosion will occur depends on a number of factors, such as the steel alloy itself, the strength and type of acid, the temperature of the environment, the length of contact, etc., some sort of corrosion invariably occurs. Alloy technology has provided materials to withstand the incidental contact of steel with acid, but the corrosion problem is particularly aggravated when there is no choice but to contact steel with acid, as in the case of chemical processing where acids are employed. In instances where the acid is not required to remain pure and where the contact is inevitable, attention has turned toward providing corrosion inhibitors in the acid medium itself to prevent corrosion of the steel surfaces that it must come into contact with, yet still deliver the acid to its ultimate destination. It would be advantageous if a new corrosion inhibitor were discovered that would be an improvement over the presently known systems. For example, a corrosion inhibitor providing a large corrosion inhibiting effect for a small proportion used would be advantageous. Additionally, there are presently no known effective high temperature HCl corrosion inhibitors for chrome steels such as Chrome 13 (CR 13) and 2205 duplex.

A specific environment in which an improved corrosion inhibitor would be appreciated is in the oil patch. It is well known that during the production life of an oil or gas well, the production zone within the well may be chemically treated or otherwise stimulated to enhance the economical production lifetime of the well. A common way of doing this is by acid fracturing or matrix acidizing, whereby a highly acidic solution, generally having a pH of less than about 1, but which may be as high as about 6.9 is injected into the well. Because of the acidic nature of the treatment fluid, the production or workover conduit which is utilized in the well in such applications encounters considerable acidic corrosion, in the forms of surface pitting, embrittlement, loss of metal component and the like.

In earlier years of producing subterranean wells, the vast majority of production and workover conduits which were utilized either temporarily or permanently in the well and through which a treatment or stimulation fluid was introduced into the well comprised carbon steels, such as J-55, P-105, N-80 and the like. Recently, due primarily to the drilling and completion of many subterranean wells through formations which contain high concentrations of corrosive fluid such as hydrogen sulfide, carbon dioxide, brine, and combinations of these constituents, the production and workover conduits for use in the wells have been made of high alloy steels. The high alloy steels, such as those employed herein in the description of the invention, include chrome steels such as 13 chrome and 2205 duplex steels and the like.

Stainless steels, first commercially developed in the 1920s, obtain their corrosion resistance by incorporation of a surface oxide film or adsorbed oxygen, of about 10 to 100 angstroms thickness. These stainless steels may be classified by their general structure and properties as: (1) martensitic; (2) ferritic; (3) austenitic (4) duplex; and (5) precipitation-hardening steels.

Martensitic alloy steels are magnetic and are hardenable by heat treating procedures. In subterranean well environments, they may be used for mild corrosion and high temperature service. Typical of such martensitic alloys is UNS S41000 (alloy 410) which contains from about 11.5% to about 13.5% chromium, about 0.15% carbon and no nickel.

Ferritic alloys are similar to martensitic alloys in that they, also, are magnetic. However, ferritic alloys are not hardenable by heat treatment and have corrosion resistance between alloys 410 and 304. They are also immune to chloride stress corrosion cracking and have a ductile to brittle transition temperature which somewhat limits their use in subterranean oil well environments. Exemplary of such ferritic alloys is UNS S44735 which contains from about 28.0 to about 30.0% chrome, about 1% nickel between about 3.6% to about 4% molybdenum, and trace amounts of copper, nitrogen, titanium and niobium.

Austenitic stainless steels are non-magnetic and hardenable by cold work, and, like ferritic alloys, are not hardenable by heat treatment. Typical of such stainless steels in UNS S31603 (alloy 316L), which contains from about 16 to about 18% chrome, from about 10 to about 14% nickel, with traces of copper and molybdenum. Also typical of such austenitic stainless steels is UNS N08020 (alloy 20): UNS N08825 (alloy 825); and UNS N08904 (alloy 904L), which contains from about 19 to about 23% chrome, from about 23 to about 45% nickel, and from about 2 and about 5% molybdenum, with small percentages of copper along with other elements. Variants of these steels, such as S31254, N08026 and N08925, which contain up to about 6% molybdenum, are also classified as austenitic stainless steels and have high chloride resistance, and are particularly effective when used in and exposed to such environments.

Duplex steels combine ferrite and austenitic steels and have 2 to 3 times a yield strength of the austenitic stainless steels. A duplex stainless steel family is resistant to pitting and crevice corrosion and has significantly better CSCC resistance, than do the 300 series stainless steel products. Such steels have favorable toughness and ductility properties, with a coefficient of expansion nearer to that of carbon steel, thus reducing stress problems. Heat transfer in such stainless steels is about 25% greater than that of the austenitic steels.

Precipitation-hardened stainless steels attribute their high strength to the precipitation of a constituent from a super-saturated solid solution through a relatively simple heat treatment but do not encounter a loss in resistance to corrosion or ductility. These steels may be heat treated. Typical of such steels are UNS S17400

(17-4PH) and UNS S15700 (PH 15-7 Mo), which contains from about 14 to about 16% chromium, and from 2 to about 3% molybdenum, with from about 6.5% to about 7.8% nickel.

Other high alloy steels include those having high nickel content. Typical of such high nickel alloys are UNS N10276 (alloy C-276); UNS N06625 (alloy 625); and UNS N06110. These high nickel alloy materials are used to prepare tubular goods for subterranean wells, and other components for use within subterranean wells where such as use is expected to encounter extremely corrosive environments. The high nickel alloys have high tolerance to extremely hostile environments and typically contain about 60% nickel, from about 15 to about 20% chromium, and from about 9 to about 16% molybdenum.

U.S. Pat. No. 3,773,465 presents a typical teaching with respect to treatment of a low alloy, or N-80-type production conduits with intensified acid corrosion inhibitor compositions, and discloses the use of cuprous iodide in such treatment. Halohydroxyalkylthio-substituted and dihydroxyalkylthio-substituted polycarboxylic acids and alkali metal salts thereof are taught as effective corrosion inhibitors for various metal surfaces in U.S. Pat. No. 4,670,163. In one embodiment, mineral acid compositions such as aqueous hydrochloric acid metal cleaning solutions exhibit diminished corrosiveness when corrosion inhibiting additives of the invention are present in the compositions.

U.S. Pat. No. 4,498,997 relates to a method of acidizing a subterranean formation or well bore employing an acidic solution containing a corrosion inhibitor composition having an inhibiting effective amount of an acetylenic alcohol, a quaternary ammonium compound, an aromatic hydrocarbon and an antimony compound intensifier. Acetylenic compounds as inhibitors are also noted as effective by P. A. Burke, et al. in "Corrosion of Chromium Steels in Inhibited Acids," Corrosion/87, Paper No. 41, National Association of Corrosion Engineers, San Francisco, Calif., 1987, U.S. Pat. No. 4,552,672 describes an improved system over the one of the '997 patent, where the improved system also contains a stabilizer to substantially prevent precipitation of solubilized antimony-containing compounds from the aqueous solution. Related to the '997 and '672 patents is the discussion of propriety blends of acetylenic alcohols, dispersants, and heterocyclic quaternized amines, with or without formamide and inorganic salts which are examined for their corrosion inhibition properties in M. L. Walker, et al., "Inhibition of High Alloy Tubulars, II: Effect of Fluoride Ion and Acid Strength," Corrosion/88, Paper No. 189, National Association of Corrosion Engineers, St. Louis, Mo., 1988.

Further of interest is U.S. Pat. No. 4,683,954 which describes a method and composition for stimulating subterranean formations containing iron deposits, although it is not related to corrosion inhibition systems. The composition comprises an admixture of (i) at least one member selected from the group consisting of hydroxylamine hydrochloride, hydroxylamine hydrobromide, hydroxylamine sulfate, hydrazine monohydrochloride, hydrazine dihydrochloride, hydrazine sulfate, hydrazine monombromide, hydrazine dibromide, hydrazine monoiodide, hydrazine diiodide and hydroquinone together with (ii) at least one member selected from the group consisting of glucono-δ-lactone, citric acid, salts of citric acid, ethylenediaminetetraacetic acid, salts of ethylenediaminetetraacetic acid, nitrilotriacetic acid, salts of nitrilotriacetic acid, hydroxyethylehtylenediaminetriacetic acid and salts of hydroxyethylethylenediaminetriacetic acid, and (III) a catalytic amount of a solubilized salt of a compound capable of providing cupric, cuprous, nickel, zinc ions or mixtures thereof. The method involves contacting the formation in a manner and amount to sequester iron. It is noted that when the treating fluid is used in a formation that is substantially non-acidic that the compounds of group (ii), above, can be omitted.

It would be desirable if a new corrosion inhibitor or additive thereto could be discovered which would be an improvement over present techniques. The present invention relates to the use of an acid soluble mercury metal salt as an intensifier alone or together with a cuprous halide, in an acid corrosion inhibitor to retard the corrosion of steel, particularly chrome steel surfaces in acid environments.

U.S. Pat. No. 3,954,636 relates to a composition and method for the acid stimulation of subterranean formations, where the composition comprises a mixture of an acid which solubilizes at least a portion of the formation, an alcohol in which the acid and carbon dioxide are soluble, and a small proportion of water and carbon dioxide. The patent off-handedly mentions that a standard corrosion inhibitor and cupric chloride may be added to the mixture, but fails to indicate the purpose and details behind the cupric chloride addition.

Two methods for inhibiting stress cracking in stainless steel using mercury are set forth in U.S. Pat. Nos. 3,880,585 and 4,004,055. Both patents contain a discussion about how what is commonly called "stress corrosion cracking" is not believed by the inventors to involve much of a "corrosion" factor. The '585 patent teaches a method of inhibiting stress cracking in stainless steel articles exposed to a chloride-ion containing fluid environment in which the surface of the stainless steel article is contacted with a trace amount of an inorganic metal salt, such as mercuric nitrate, or with the metal corresponding to the cation of the salt, such as mercury. This is to enlarge the anodic areas on the surface and increase the uniformity of the electrical potential of the surface thereby eliminating concentrated non-uniform attack on the surface and attendant cracking. The method of the '055 patent also relates to inhibiting the stress cracking of stainless steel exposed to a chloride-ion fluid environment where the surface of the stainless steel is coated with at least a trace amount of metallic mercury. The invention therein also contemplates the mercury/stainless steel amalgam.

SUMMARY OF THE INVENTION

Accordingly, it is an object of the present invention to provide an improved intensifier for use in corrosion inhibitors that is effective in inhibiting the corrosion of steel surfaces in acid environments.

It is another object of the present invention to provide a corrosion inhibitor intensifier that may be employed in very low proportions.

It is yet another object of the invention to provide an improved corrosion inhibitor intensifier that may be readily incorporated into conventional corrosion inhibitors used in acid injection systems to enhance production from subterranean formations.

In carrying out these and other objects of the invention, there is provided, in one form, a corrosion inhibitor composition for inhibiting the corrosion of steel in the presence of an acidic medium which has an effective amount of an acid soluble mercury metal salt intensifier; and at least one component selected from the group of corrosion inhibitor components consisting of an acetylenic alcohol, a quaternary ammonium compound, an aromatic hydrocarbon and mixtures thereof.

DETAILED DESCRIPTION OF THE INVENTION

It has been discovered that extremely small amounts of an acid soluble mercury metal salt, such as a mercury halide, for instance mercuric chloride, is surprisingly effective in inhibiting corrosion of steel surfaces when employed together with corrosion inhibitors. Although it is appreciated that metallic mercury and mercury compounds are undesirable to release into the environment at certain levels, it is further surprisingly noted that the proportions necessary for the implementation of the present invention are below those levels. Data are presented herein for the spent acid residuals showing representative low levels of mercury.

The acid soluble mercuric metal salt intensifier of the present invention may be used alone or in conjunction with a co-intensifier, such as an acid soluble copper metal salt, for example, a cuprous halide. It will be appreciated that the intensifier of this invention may be used with conventional corrosion inhibitors such as those described below, in any application where a steel surface, such as stainless steel, high alloy or other steel, is exposed to an acid environment. While the specific implementation of this invention is described in the context of the oil path, the invention may certainly find uses in other applications where it is desirable to reduce corrosion, such as chemical processes that necessarily require the contact of acids with conduits, fittings, and other equipment.

In the implementation of the invention in the production of fluids from subterranean reservoirs, a fluid is introduced through a high alloy steel member or conduit positioned within the well. The fluid is an acidic injection medium and an acid corrosion inhibitor, which is intensified by the introduction into the treatment fluid and contact with the steel member of an acid soluble mercuric metal salt, which may be mercuric chloride, alone or together with a cuprous halide, such as cuprous chloride. The invention also encompasses a method of treating a well for enhancement of production within a production zone by introduction into the steel conduit an intensified acid corrosion inhibitor composition.

The fluid which is contemplated for use in one aspect of the present invention for treatment of a subterranean well for enhancement of production will be aqueous based; that is, it will be formed using sea water available at the well location, a brine, tap water or similar fluid. The amount of fluid used for the treatment will vary, of course, from well to well, and will be based upon the particular application at hand, and the amount thereof is not particularly critical to the method of the present invention. It will be appreciated that one skilled in the art of corrosion inhibition will be able to adapt the teachings of this invention to applications outside the realm of oil and gas recovery, such as the area of chemical processing, with only routine experimentation.

The high alloy steel member which is introduced into the well may be provided either in the form of a section or string of workover tubing, or may be permanently implaced production tubing. It may also include, as opposed to tubing per se, any high alloy steel surface, such as the lining of down hole pumps, gas separators, packer mandrels, tubing hangers, safety valves, side pocket mandrels, wire line tools and the like. In any event, the phase "high alloy steel conduit" is meant to generally refer to oil country tubular goods or metal surfaces of down hole equipment of a stainless steel, as described above. Preferably, such high alloy steel members will be provided in the form of 2205 steel, which generally contains about 22% by weight chrome and about 5% by weight nickel, with the balance of the materials varying depending upon the source of the conduit or surface of the member. Alternatively, high alloy steel conduits may also be formed of tubing joints having about 13% by weight chrome. This tubing normally is provided in 30 foot to 60 foot sections or "joints" which are threadedly secured to one another and introduced into the well to form a string of tubular conduit which has its lower end positioned within a production zone, or location, in the well to be treated.

If this tubing is provided in the form of a work-string, it may be retrieved from the well. If the tubing is production casing, it will be cemented in place at some time during the early life of the well, and before treatment of the subterranean well zone. If the steel is used in down hole equipment of a non-conduit nature, it may be permanently placed, or may be retrievable.

The treatment fluid has a primary additive an acidic injection medium which may be any compatible acid, such as hydrochloric, formic, citric, hydrofluoric, acetic, and mixtures thereof. The fluid with the acid injection medium therein should have a pH of no greater than about 6.9.

The treatment fluid also contemplates incorporation of an acid corrosion inhibitor which typically will be provided in treatment concentrations of from about 1,000 ppm, based upon the weight of the entire treatment fluid to about 60,000 ppm of such weight. Of course, the treatment level of the acid corrosion inhibitor will vary depending upon the particular physical characteristics of the well, the high alloy steel conduit, temperature and pressure considerations, the selected acidic injection medium, and the like.

The acid corrosion inhibitor to be combined with the acidic injection medium and the intensifier can be any acetylenic compound such as an acetylenic alcohol; a nitrogen compound, such as a quaternary ammonium compound; and aromatic hydrocarbon or mixtures thereof, as is known to those skilled in the art. For example, acid corrosion inhibitors as made and described in U.S. Pat. Nos. 3,514,410; 3,404,094; 3,107,221; 2,993,863; and 3,382,179; may be utilized in accordance with the present invention.

Examples of acetylenic compounds which may be used include hexynol, dimethyl hexynol, diethyl hexynediol, dimethyl hexynediol, dimethyl oxtynediol, methyl butynol, methyl pentynol, ethynyl cyclohexynol, 2-ethyl hexynol, phenyl butynol, and ditertiary acetylenic glycol.

Other acetylenic compounds which can be employed in accordance with the present invention include, but are not limited to, butynediol, 1-ethynylcyclohexanol, 3-methyl-1-nonyn-3-ol, 2-methyl-3-butyn-2-ol, also 1-propyn-3-ol, 1-butyn-3-ol, 1-pentyn-3-ol, 1-heptyn-3-ol, 1octyn-3-ol, 1-nonyn-3-ol, 1-decyn-3-ol, 1-(2,4,6-trimethyl-3 cyclohexenyl)-3-propyne-1-ol, and in general acetylenic compounds having the general formula:

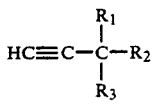

wherein $R_1$ is —H, —OH, or an alkyl radical; $R_2$ is —H, or an alkyl, phenyl, substituted phenyl or hydroxy-alkyl radical; and $R_3$ is —H or an alkyl, phenyl, substituted phenyl or hydroxyalkyl radical.

Acetylenic sulfides having the general formula

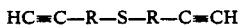

can also be employed in the present invention in lieu of acetylenic alcohols. Examples of these are dipropargyl sulfide, bis-(1-methyl-2-propynyl)sulfide and bis-(2-ethynyl-2-propyl)sulfide.

The nitrogen or ammonia compounds that can be employed in accordance with the present invention include, but are not limited to, those amines having from one to twenty-four carbon atoms in each alkyl moiety as well as the six-membered heterocyclic amines, for example, alkyl pyridines, crude quinolines and mixtures thereof. This includes such amines as ethylamine, diethylamine, triethylamine, propylamine, dipropylamine, tripropylamine, mono-, di- and tripentylamine, mono-, di- and trihexylamine and isomers of these such as isopropylamine, tertiary-butylamine, etc. This also includes alkyl pyridines having from one to five nuclear alkyl substituents per pyridine moiety, such alkyl substituents having from one to 12 carbon atoms and preferably those having an average of six carbon atoms per pyridine moiety, such as a mixture of high boiling tertiary-nitrogen-heterocyclic compounds, such as HAP (high alkyl pyridines), Reilly 10–20 base and alkyl pyridines H3. Other nitrogen compounds include the crude quinolines having a variety of substituents.

The inhibitor may also contain a number of other constituents, such as nonyl phenol adducts and tallow amine adducts, tall oil adducts, such as surfactants. Oil wetting components, such as heavy aromatic solvents, may also be present.

The third component of the treatment fluid of the present invention is an intensifier for the acid corrosion inhibitor. The intensifier may be added to the treatment fluid independently and separately of the acid corrosion inhibitor. Alternatively, the intensifier may be a component part of the acid corrosion inhibitor. In either event, the intensifier is provided for purposes of assisting, aiding and amplifying the corrosion inhibition effects of the acid corrosion inhibitor.

The intensifier contemplated for use in the present invention is any acid soluble mercury metal salt, such as a mercuric halide, and is most preferably a member selected from the class consisting of mercuric chloride, mercuric acetate, mercuric oxides, and mercuric nitrate. Group Va Elemental Series metals are useful in the intensifiers of this invention, besides mercury. It is generally preferred that mercuric chloride be used, although the selected intensifier will depend upon the particular application at hand, the steel surface used, temperature and pressure factors, the particular selected acid corrosion inhibitor, the acid utilized, and the water used to form the treatment fluid. Those skilled in the art will be able to selected the best intensifier for the particular application at hand by pre-testing techniques as utilized in the working examples, below. Again, the amount of intensifier incorporated in the acid injection medium with the acid corrosion inhibitor will vary, depending on the parameters described above, but will typically be no less than about 0.05 pound per thousand gallons of acidic injection medium, as an example only. Although these is no upper limit to the amount of intensifier employed, it may be uneconomic to use more than about 4 to 5 pounds per thousand gallons of acid injection medium, since it is expected that no significant increase in benefit may be obtained above that level. In one optimized embodiment, the acid soluble mercury metal salt should be present in an amount of at least 0.30 weight %, based on the inhibitor.

Other optional co-intensifiers include acid soluble copper metal salts, such as a cuprous halide, and is preferably a member selected from the class consisting of cuprous chloride, cupric formate, copper acetate, and cuprous nitrate. Generally, cuprous chloride is preferred. There is evidence under certain conditions that the combination of cuprous chloride with mercuric chloride gives synergistic effect and an improvement in corrosion inhibition that is greater than the use of each compound used separately. Other optional co-intensifiers that may be employed include acid soluble bismuth metal salts and antimony metal salts similar to the copper metal salts described above.

As noted, very small proportions of the acid soluble mercury metal salt need be used. Using the acid corrosion inhibitor as a basis, the preferred amount need only be 0.30 wt.%. The preferred amounts of the copper metal salt, bismuth metal salt and antimony metal salt should be at least 0.6 wt.% based on the acid corrosion inhibitor. It will be understood that these preferred ranges are not limiting, but simply exemplary. It is one of the most unusual aspects of the present invention that the intensifier may be used in extremely small amounts, even those mentioned above, and yet still be effective. The optimal amount for a particular application will depend on a number of factors including, but not limited to temperature of the acidic medium, the nature of the steel exposed in the medium, etc., and one skilled in the art may determine such levels after merely routine experimentation.

The invention will be further illustrated with reference to the following illustrative examples.

EXAMPLES 1–104

Corrosion rate tests were performed on test coupons of N-80 carbon steel, chrome 13 and 2205 duplex steels in a simulated treatment fluid comprising water containing hydrochloric acid, with the acidic injection medium being provided in the form of 100 ml 15% hydrochloric acid (HCl). To the treatment fluid with the acidic injection medium provided therein were added the indicated gallons per thousand gallons (gpt) of fluid selected, and commercially available inhibitors, "A", "B" or "C". The generic composition of such sample inhibits can generally be described as follows:

| Inhibitor | Generic Description |
|---|---|
| A | Heterocyclic quaternary product |
| B | Mannich reaction product |
| C | Heterocyclic quaternary product with small amount of cuprous chloride and mercuric chloride built into it (see Table VIII) |

After introduction of the selected inhibitor to the treatment fluid, the indicated intensifiers were added in the indicated amounts. Alternatively, the intensifiers could be added earlier. The simulated treatment fluid with the respective acid corrosion inhibitor and intensifier additions were then placed into high temperature and high pressure corrosion test cells to which were added the test coupons of the indicated steels. The coupons were permitted to remain in the simulated treatment fluid for six hours at a pressure between 4,000 and 5,000 psi. Thereafter, the coupons were removed from the test cell, neutralized, scrubbed and weighed for weight loss described in pounds per sq. ft. (lb./ft$^2$). Of course, the lower the weight loss, the more effective the corrosion inhibitor and the intensifier in preventing corrosion. The effect with and without optional antimony salts and bismuth salts is also explored.

Special attention is directed to Examples 9, 10, 15, 21, 24, and 26 which show exceptional corrosion inhibition ability for all tested steels. At the higher temperature of 350° F., Examples 33, 34, 38, 39 and 41 show exceptional results for the 2205 duplex steel. See also the results obtained with corrosion inhibitor C in Tables VII and VIII.

Shown in Table I is the effective corrosion control of N-80 and Cr 13 steels using 4 gpt of inhibitor A and 0.012 gms./100 ml acid of CuCl and 0.006 gms./100 ml acid of HgCl$_2$, as seen in Example 6. See also Examples 7, 8, 9 and 10 using increasing amounts of HgCl$_2$. An effective inhibitor of 2205 duplex steel is obtained in Example 10 using 0.010 gms. of HgCl$_2$. Effective control of 2205 corrosion is also seen using 6 gpt of inhibitor A, only 0.003 gms. HgCl$_2$ and 0.08 gms. of CuCl, as seen in Example 22; see also Examples 23–27.

TABLE I

Corrosion Rates at 250° F. Using Corrosion Inhibitor A

| Ex. | gpt cor. ih. A | CuCl | HgCl$_2$ | SbCl$_3$ | BiCl$_3$ | N-80 | Cr 13 | 2205 |
|---|---|---|---|---|---|---|---|---|
| | | gms/100 ml 15% HCl | | | | lbs/ft$^2$ Corrosion Rate | | |
| 1 | 4 | — | — | — | — | 0.482 | 0.507 | 1.019 |
| 2 | 4 | — | 0.01 | — | — | 0.013 | 0.008 | 0.084 |
| 3 | 4 | 0.06 | — | — | — | 0.026 | 0.239 | 0.714 |
| 4 | 4 | 0.004 | 0.002 | — | — | 0.067 | 0.180 | 0.066 |
| 5 | 4 | 0.008 | 0.004 | — | — | 0.012 | 0.068 | 0.040 |
| 6 | 4 | 0.012 | 0.006 | — | — | 0.023 | 0.013 | 0.158 |
| 7 | 4 | 0.016 | 0.008 | — | — | 0.005 | 0.007 | 0.066 |
| 8 | 4 | 0.020 | 0.010 | — | — | 0.005 | 0.005 | 0.073 |
| 9 | 4 | 0.030 | 0.010 | — | — | 0.004 | 0.004 | 0.052 |
| 10 | 4 | 0.040 | 0.010 | — | — | 0.003 | 0.004 | 0.036 |
| 11 | 4 | 0.040 | 0.010 | 0.040 | — | 0.016 | 0.012 | 0.081 |
| 12 | 4 | 0.040 | 0.010 | — | 0.040 | 0.262 | 0.016 | 0.025 |
| 13 | 4 | 0.060 | 0.010 | — | — | 0.004 | 0.005 | 0.079 |
| 14 | 4 | 0.060 | 0.010 | 0.060 | — | 0.008 | 0.082 | 0.053 |
| 15 | 4 | 0.060 | 0.010 | — | 0.060 | 0.025 | 0.025 | 0.022 |
| 16 | 6 | 0.005 | — | — | — | 0.674 | 0.265 | — |
| 17 | 9 | 0.004 | — | — | — | 0.864 | 0.095 | — |
| 18 | 10 | 0.005 | — | — | — | 0.877 | 0.058 | — |
| 19 | 6 | 0.003 | 0.040 | — | — | — | — | 0.050 |
| 20 | 8 | 0.004 | 0.040 | — | — | — | — | 0.046 |
| 21 | 10 | 0.005 | 0.040 | — | — | — | — | 0.046 |
| 22 | 6 | 0.003 | 0.080 | — | — | — | — | 0.033 |
| 23 | 8 | 0.004 | 0.080 | — | — | — | — | 0.031 |
| 24 | 10 | 0.005 | 0.080 | — | — | — | — | 0.025 |
| 25 | 6 | 0.003 | 0.120 | — | — | — | — | 0.032 |
| 26 | 8 | 0.004 | 0.120 | — | — | — | — | 0.032 |
| 27 | 10 | 0.005 | 0.120 | — | — | — | — | 0.020 |
| 28 | 6 | 0.003 | 0.005 | 0.040 | — | — | — | 0.019 |
| 29 | 8 | 0.004 | 0.007 | 0.080 | — | — | — | 0.009 |
| 30 | 10 | 0.005 | 0.009 | 0.120 | — | — | — | 0.018 |

TABLE II

Corrosion Rates at 300° F. Using Corrosion Inhibitor A

| Ex. | gpt cor. ih. A | CuCl | HgCl$_2$ | SbCl$_3$ | BiCl$_3$ | N-80 | Cr 13 | 2205 |
|---|---|---|---|---|---|---|---|---|
| | | gms/100 ml 15% HCl | | | | lbs/ft$^2$ Corrosion Rate | | |
| 31 | 20 | — | — | — | — | 0.840 | 0.950 | 0.989 |
| 32 | 20 | 0.010 | 0.005 | — | — | 0.832 | 0.776 | 0.925 |
| 33 | 20 | 0.020 | 0.010 | — | — | 0.183 | 0.374 | 0.395 |
| 34 | 20 | 0.040 | 0.020 | — | — | 0.049 | 0.113 | 0.226 |
| 35 | 20 | 0.060 | 0.020 | — | — | 0.043 | 0.112 | 0.168 |
| 36 | 20 | 0.060 | 0.020 | 0.120 | — | 0.018 | 0.024 | 0.034 |
| 37 | 20 | 0.060 | 0.020 | — | 0.120 | 0.136 | 0.881 | 0.136 |
| 38 | 20 | 0.120 | 0.020 | — | — | 0.023 | 0.298 | 0.123 |
| 39 | 20 | 0.240 | 0.020 | 0.240 | — | 0.010 | 0.019 | 0.015 |
| 40 | 20 | 0.240 | 0.020 | — | 0.240 | 0.039 | 0.130 | 0.039 |
| 41 | 20 | 0.240 | — | — | — | 0.248 | 0.976 | 0.181 |
| 42 | 20 | 0.080 | 0.010 | 0.120 | — | 0.095 | 0.402 | 0.025 |
| 43 | 20 | 0.080 | 0.010 | — | 0.180 | 0.079 | 0.118 | 0.124 |
| 44 | 20 | 0.020 | 0.010 | 0.120 | — | 0.020 | 0.037 | 0.056 |
| 45 | 20 | 0.020 | 0.010 | 0.180 | — | 0.054 | 0.044 | 0.055 |
| 46 | 20 | 0.020 | 0.010 | 0.240 | — | 0.126 | 0.047 | 0.040 |
| 47 | 20 | 0.720 | 0.010 | — | — | 0.013 | 0.011 | 0.068 |

TABLE II-continued

| | | Corrosion Rates at 300° F. Using Corrosion Inhibitor A | | | | | | |
|---|---|---|---|---|---|---|---|---|
| | gpt | gms/100 ml 15% HCl | | | | lbs/ft² Corrosion Rate | | |
| Ex. | cor. ih. A | CuCl | HgCl₂ | SbCl₃ | BiCl₃ | N-80 | Cr 13 | 2205 |
| 48 | 20 | — | 0.010 | — | — | — | 0.652 | — |

Effective corrosion control of N80 steel is provided using 20 gpt of inhibitor A, 0.04 gms. CuCl and 0.02 gms. HgCl₂ as seen in Example 34; see also Example 35. Further, effective corrosion control of N-80 and Cr 13 and fair control for 2205 may be obtained by using 20 pgt of inhibitor, A, 0.01 gms. HgCl₂ and 0.72 gms CuCl, in accordance with Example 47.

TABLE III

| | | Corrosion Rates at 350° F. Using Corrosion Inhibitor A | | | | | | |
|---|---|---|---|---|---|---|---|---|
| | gpt | gms/100 ml 15% HCl | | | | lbs/ft² Corrosion Rate | | |
| Ex. | cor. ih. A | CuCl | HgCl₂ | SbCl₃ | BiCl₃ | N-80 | Cr 13 | 2205 |
| 49 | 20 | — | — | — | — | 0.839 | 0.887 | 0.975 |
| 50 | 20 | 0.020 | 0.010 | — | — | 0.842 | 0.495 | 0.950 |
| 51 | 20 | 0.020 | 0.010 | 0.240 | — | 0.841 | 0.203 | 0.022 |
| 52 | 20 | 0.120 | 0.010 | 0.120 | — | 0.691 | 0.231 | 0.019 |
| 53 | 20 | 0.120 | 0.010 | 0.240 | — | 0.466 | 0.169 | 0.058 |
| 54 | 20 | 0.120 | 0.020 | — | — | 0.860 | 0.129 | 0.940 |
| 55 | 20 | 0.240 | 0.020 | — | — | 0.871 | 0.116 | 0.941 |
| 56 | 20 | 0.240 | 0.020 | 0.120 | — | 0.381 | 0.121 | 0.052 |
| 57 | 20 | 0.240 | 0.020 | 0.240 | — | 0.363 | 0.089 | 0.036 |
| 58 | 20 | 0.240 | 0.020 | — | 0.240 | 0.867 | 0.139 | 0.346 |
| 59 | 20 | — | 0.020 | 0.240 | — | 0.848 | 0.361 | 0.130 |
| 60 | 20 | 1.500 | 0.020 | — | — | 0.153 | 0.941 | 0.648 |
| 61 | 20 | 1.500 | 0.030 | — | — | 0.115 | 0.926 | 0.434 |
| 62 | 20 | 1.500 | 0.040 | — | — | 0.129 | 0.943 | 0.428 |
| 63 | 20 | 0.040 | 0.020 | 0.500 | — | 0.025 | — | — |
| 64 | 20 | 0.060 | 0.030 | 0.500 | — | 0.012 | — | — |
| 65 | 20 | 0.080 | 0.040 | 0.500 | — | 0.016 | — | — |

TABLE IV

| | | Corrosion Rates at 250° F. Using Corrosion Inhibitor B | | | | | | |
|---|---|---|---|---|---|---|---|---|
| | gpt | gms/100 ml 15% HCl | | | | lbs/ft² Corrosion Rate | | |
| Ex. | cor. ih. B | HgCl₂ | CuCl | SbCl₃ | BiCl₃ | N-80 | Cr 13 | 2205 |
| 66 | 10 | — | — | — | — | 0.209 | 0.306 | 0.909 |
| 67 | 4 | 0.010 | — | — | — | 0.029 | 0.116 | 0.278 |
| 68 | 4 | 0.010 | 0.040 | — | — | 0.018 | 0.076 | 0.090 |
| 69 | 4 | 0.006 | 0.012 | — | — | 0.023 | 0.076 | 0.112 |
| 70 | 4 | 0.006 | 0.040 | — | — | 0.015 | 0.081 | 0.075 |
| 71 | 4 | — | — | 0.040 | — | 0.015 | 0.036 | 0.667 |
| 72 | 4 | — | 0.040 | 0.040 | — | 0.012 | 0.097 | 0.614 |
| 73 | 4 | 0.010 | 0.040 | 0.040 | — | 0.014 | 0.076 | 0.034 |
| 74 | 4 | 0.010 | 0.060 | — | 0.060 | 0.027 | 0.151 | 0.061 |
| 75 | 4 | 0.010 | 0.040 | — | 0.040 | 0.015 | 0.118 | 0.067 |

As shown in Table IV, effective corrosion control of N-80 is obtained using 4 gpt of inhibitor B, 0.01 gms. of HgCl₂ and 0.04 gms. CuCl as seen in Example 68, and fair to poor control of Cr 13 and 2205. See also Examples 69 and 70.

TABLE V

| | | Corrosion Rates at 300° F. Using Corrosion Inhibitor B | | | | | | |
|---|---|---|---|---|---|---|---|---|
| | gpt | gms/100 ml 15% HCl | | | | lbs/ft² Corrosion Rate | | |
| Ex. | cor. ih. B | HgCl₂ | CuCl | SbCl₃ | BiCl₃ | N-80 | Cr 13 | 2205 |
| 76 | 20 | — | — | — | — | 0.878 | 0.920 | 1.013 |
| 77 | 20 | 0.02 | 0.720 | — | — | 0.060 | 0.018 | 0.125 |
| 78 | 20 | 0.020 | 0.060 | 0.120 | — | 0.131 | 0.285 | 0.260 |
| 79 | 20 | 0.020 | 0.240 | — | 0.240 | 0.253 | 0.808 | 0.187 |
| 80 | 20 | 0.050 | — | — | — | 0.840 | 0.720 | 0.946 |

Effective control of Cr 13 corrosion is available using 20 gpt of inhibitor B, 0.02 gms HgCl₂, 0.72 gms CuCl, with fair control of N-80 and poor control of 2205, according to Example 77.

TABLE VI

| | | Corrosion Rates at 350° F. Using Corrosion Inhibitor B | | | | | | |
|---|---|---|---|---|---|---|---|---|
| | gpt | gms/100 ml 15% HCl | | | | lbs/ft² Corrosion Rate | | |
| Ex. | cor. ih. B | HgCl₂ | CuCl | SbCl₃ | BiCl₃ | N-80 | Cr 13 | 2205 |
| 81 | 20 | — | — | — | — | 0.868 | 0.937 | 0.965 |
| 82 | 20 | 0.080 | — | — | — | 0.848 | 0.801 | 0.976 |

TABLE VI-continued

Corrosion Rates at 350° F. Using Corrosion Inhibitor B

| Ex. | gpt cor. ih. B | gms/100 ml 15% HCl | | | | lbs/ft² Corrosion Rate | | |
|---|---|---|---|---|---|---|---|---|
| | | HgCl₂ | CuCl | SbCl₃ | BiCl₃ | N-80 | Cr 13 | 2205 |
| 83 | 20 | 0.050 | 0.500 | — | — | 0.841 | 0.918 | 0.832 |
| 84 | 20 | 0.020 | 0.050 | 0.500 | — | 0.108 | 0.044 | 0.567 |
| 85 | 20 | 0.020 | 0.050 | — | 0.500 | 0.864 | 0.959 | 0.951 |

The Examples of Table VI indicate no effective control with inhibitor B at 350° F.

TABLE VII

Corrosion Rates at 350° F. and 4,000–5,000 psi in 15% HCl Using Corrosion Inhibitor A, B and C

| Ex. | Inhibitor | gpt, inh. | gms/100 ml 15% HCl | | lbs/ft² Corrosion Rate | |
|---|---|---|---|---|---|---|
| | | | CuCl | HgCl₂ | Cr 13 | 2205 |
| 86 | A | 40 | 1.500 | 0.020 | 0.039 | 0.363 |
| 87 | A | 50 | 1.500 | 0.020 | 0.040 | 0.479 |
| 88 | B | 40 | 1.500 | 0.020 | 0.909 | 0.429 |
| 89 | B | 50 | 1.500 | 0.020 | 0.912 | 0.472 |
| 90 | C | 40 | 1.4 | — | 0.054 | 0.030 |
| 91 | C | 50 | 1.4 | — | 0.034 | 0.025 |

Particular attention should be given to the excellent results obtained using the intensifier of this invention with corrosion inhibitor C as seen in Examples 90 and 91 an d92–104.

EXAMPLES 92-104

Because weight loss is not the only test criteria for determining the ability of a given corrosion inhibitor to function satisfactorily in protecting a metal surface, the coupons were also tested and evaluated for possible pitting caused by exposure to the acidic environment of the simulated treatment fluid. After the coupons were removed from the respective test cell, pitting was visually observed using a 10 point scale, with 9 defining the most unsatisfactory result, and indicating extreme pitting and/or delamination. A rating of 0 with respect to pitting was utilized if the coupon, when compared to an untested coupon, appeared approximately the same as the untested coupon. When a rating of 9 was found on any coupon, pitting and/or delimination had occurred over at least 50% of the surface area of the coupon. A rating of 1, 2 or 3 indicates that the coupon is free of pits and delamination, but is discolored with increasing discoloration as the number increases. The results of this test, as well as weight loss on additional experiments are set forth in Table VII.

TABLE VIII

Corrosion Rates and Pitting Using Inhibitor C and 2205 Duplex Steel
(Inhibitor C contains approx. 0.4% HgCl₂ and approx. 0.6% CuCl.)

| Ex. | gpt of Inhibitor C in 15% HCl | % of CuCl in 15% HCl | °F. | 2205 Duplex | | | |
|---|---|---|---|---|---|---|---|
| | | | | Hrs. | Total Hrs. | lbs/ft² | Pitting rating |
| 92 | 20 | 0.72 | 325 | 6 | 8 | 0.048 | 1 |
| 93 | 30 | 0.72 | 325 | 6 | 8 | 0.032 | 1 |
| 94 | 40 | 0.72 | 325 | 6 | 8 | 0.039 | 2 |
| 95 | 30 | 0.72 | 350 | 2 | 4 | 0.027 | 1 |
| 96 | 40 | 0.72 | 350 | 3 | 5 | 0.035 | 1 |
| 97 | 30 | 1.44 | 350 | 4 | 6 | 0.054 | 3 |
| 98 | 40 | 1.44 | 350 | 4 | 6 | 0.031 | 1 |
| 99 | 40 | 1.44 | 350 | 5 | 7 | 0.036 | 1 |
| 100 | 40 | 1.44 | 350 | 6 | 8 | 0.043 | 3 |
| 101 | 50 | 1.44 | 350 | 6 | 8 | 0.029 | 1 |
| 102 | 60 | 1.44 | 375 | 3 | 5.5 | 0.055 | 2 |
| 103 | 60 | 1.44 | 400 | 1 | 4 | 0.081 | 7 |
| 104 | 30 | 1.44 | 400 | 0 | 3 | 0.037 | 1 |

SAMPLES 1-12

Samples 1–12 concern the contents of spent acid residuals following an acidizing treatment. They verify that these is minimal mercury feedback present utilizing the low quantities of the present invention. Such low levels would permit use of the intensifiers of the present invention with assurance of negligible and insignificant environmental consequences.

Sample 1: Sample of aqueous inhibited acid before corrosion test.

Sample 2: Sample of aqueous inhibited acid before corrosion test and after neutralization with oyster shells and crude filtration to remove the unreacted shells and residue.

Sample 3: Sample of deionized water.

Samples 4, 7 and 10: Samples of the aqueous inhibited acid *after* the corrosion test.

Samples 5, 8 and 11: Samples of the parrafinic oil covering the inhibited acid *after* the corrosion test.

Samples 6, 9 and 12: Samples of the aqueous inhibited acid *after* corrosion test and neutralization with oyster shells and crude filtration to remove the unreacted shells and residue.

| | Series I | |
|---|---|---|
| Test Conditions: | 20 gpt corrosion inhibitor C, 15% HCl Room temperature mixture | |
| Metal | Sample 1 (ppm) | Sample 2 (ppm) |
| Cr | <0.4 | <0.4 |
| Cu | 93.4 | 90.2 |
| Fe | 1.13 | 85.7 |
| Hg | 50.7 | <0.1 |
| Ni | <0.251 | 0.273 |
| Sb | <0.392 | <0.392 |

| Series II | |
|---|---|
| Test Conditions: Lab blank; deionized water | |
| Metal | Sample 3 (ppm) |
| Cr | <0.4 |
| Cu | <0.4 |
| Fe | <0.2 |
| Hg | <0.1 |
| Ni | <0.25 |

-continued

| Series II |  |
|---|---|
| Test Conditions: Lab blank; deionized water | |
| Metal | Sample 3 (ppm) |
| Sb | <0.392 |

| Series III | | | |
|---|---|---|---|
| Test Conditions: 20 gpt corrosion inhibitor C, SS-2205 Steel, 15% HCl 6 Hours at 300° F., 4000 psi | | | |
| Metal | Sample 4 (ppm) | Sample 5 (ppm) | Sample 6 (ppm) |
| Cr | 940 | 2.7 | 784 |
| Cu | 110 | 0.98 | 104 |
| Fe | 7320 | 8.3 | 6200 |
| Hg | 5.1 | 0.57 | <0.1 |
| Ni | 470 | 1.4 | 470 |
| Sb | <0.392 | <2.0 | <0.392 |

| Series IV | | | |
|---|---|---|---|
| Test Conditions: 20 gpt corrosion inhibitor C, 60 lb/mgal CuCl, SS-2205 steel coupons, 15% HCl 6 Hours at 300° F., 4000 psi | | | |
| Metal | Sample 7 (ppm) | Sample 8 (ppm) | Sample 9 (ppm) |
| Cr | 211 | 1.60 | 178 |
| Cu | 5500 | 19.1 | 5850 |
| Fe | 884 | 3.8 | 791 |
| Hg | 8.7 | 0.36 | <0.1 |
| Ni | 53.2 | <1.30 | 48.8 |
| Sb | <0.392 | <2.0 | <0.392 |

| Series V | | | |
|---|---|---|---|
| Test Conditions: 20 gpt corrosion inhibitor C, 5 lb/mgal CuCl, 15 lb/mgal SbCl$_3$, SS-2205 steel coupons, 15% HCl 6 Hours at 300° F., 4000 psi | | | |
| Metal | Sample 10 (ppm) | Sample 11 (ppm) | Sample 12 (ppm) |
| Cr | 163 | <0.2 | 116 |
| Cu | 459 | <0.2 | 38.1 |
| Fe | 1780 | 2.70 | 1360 |
| Hg | 5.0 | 0.36 | <0.1 |
| Ni | 57.5 | <1.3 | 43.5 |
| Sb | 359.0 | — | 258.0 |

Many modifications may be made in the present invention without departing from spirit and scope thereof which are defined only by the appended claims. For example, a particular co-intensifier or combination of intensifiers not explicitly recited herein, but which falls within the claims may prove to have advantageous characteristics.

I claim:

1. An intensified corrosion inhibitor composition for inhibiting the corrosion of steel in the presence of an acidic medium comprising:
   an effective amount of an acid soluble mercury metal salt intensifier; and
   a corrosion inhibitor.

2. The intensified corrosion inhibitor composition of claim 1 where the corrosion inhibitor is selected from the group of corrosion inhibitor components consisting of an acetylenic alcohol, a quaternary ammonium compound, an aromatic hydrocarbon and mixtures thereof.

3. The intensified corrosion inhibitor composition of claim 1 where the acid soluble mercury metal salt is selected from the group consisting of mercuric chloride, mercuric acetate, mercuric nitrate, mercuric oxides and combinations thereof.

4. The intensified corrosion inhibitor composition of claim 1 further comprising an effective amount of an acid soluble copper metal salt as a co-intensifier.

5. The intensified corrosion inhibitor composition of claim 4 further comprising an effective amount of a co-intensifier selected from the group consisting of an acid soluble bismuth metal salt, an acid soluble antimony metal salt, and mixtures thereof.

6. The intensified corrosion inhibitor composition of claim 5 where the copper metal salt is selected from the group consisting of cuprous chloride, copper acetate, cupric formate, cuprous nitrate and mixtures thereof.

7. The intensified corrosion inhibitor composition of claim 1 further comprising an effective amount of a co-intensifier selected from the group consisting of an acid soluble bismuth metal salt, an acid soluble antimony metal salt, and mixtures thereof.

8. In a fluid for contact with a steel surface, the fluid comprising an acidic medium and an acid corrosion inhibitor, the improvement comprising:
   an intensifier for introduction into the fluid for effective treatment contact with the surface, where the intensifier comprises an acid soluble mercury metal salt.

9. The improved fluid of claim 8 where the acidic medium includes a member selected from the group of acids consisting of hydrochloric acid, hydrofluoric acid, acetic acid, formic acid, citric acid and mixtures thereof.

10. The improved fluid of claim 8 where the steel surface is a high alloy steel surface comprising at least about 13% by weight chrome.

11. The improved fluid of claim 8 where the steel surface is a high alloy steel surface comprising at least about 22% by weight chrome and at least about 5% by weight nickel.

12. The improved fluid of claim 8 where the fluid is for treatment of a subterranean well for enhancement of production within the well, and where the steel surface is a high alloy conduit for production fluids.

13. The improved fluid of claim 8 where the acid soluble mercury metal salt is selected from the group consisting of mercuric chloride, mercuric acetate, mercuric nitrate, mercuric oxides and mixtures thereof.

14. The improved fluid of claim 8 further comprising an effective amount of a co-intensifier selected from the group consisting of an acid soluble bismuth metal salt, an acid soluble antimony metal salt, and mixtures thereof.

15. The improved fluid of claim 8 where an acid soluble copper metal salt is also present as a co-intensifier with the mercuric halide.

16. The improved fluid of claim 15 where the acid soluble copper metal salt is selected from the group consisting of cuprous chloride, copper acetate, cupric formate, cuprous nitrate and mixtures thereof.

17. The intensified corrosion inhibitor of claim 15 further comprising an effective amount of a co-intensifier selected from the group consisting of an acid soluble bismuth metal salt, an acid soluble antimony metal salt, and mixtures thereof.

18. The improved fluid of claim 8 where the intensifier combination is introduced into the fluid as a component of the acid corrosion inhibitor.

19. The improved fluid of claim 8 where the acid corrosion inhibitor is introduced into the fluid and thereafter the intensifier is introduced into the fluid.

20. In a fluid for treatment of a subterranean well for enhancement of production within the well by introduction of the fluid in contact with a high alloy steel surface positioned within the well, the fluid comprising an acidic injection medium and an acid corrosion inhibitor, the improvement comprising:

an intensifier combination for introduction into the fluid and for effective treatment contact with the surface, the intensifier combination comprising an effective amount of an acid soluble mercury metal salt and an effective amount of an acid soluble copper metal salt.

21. The improved fluid of claim 20 where the acid soluble mercury metal salt is selected from the group consisting of mercuric chloride, mercuric acetate, mercuric nitrate, mercuric oxides and mixtures thereof, and where the acid soluble copper metal compound is selected from the group consisting of cuprous chloride, copper acetate, cupric formate and cuprous nitrate.

22. The improved fluid of claim 20 further comprising an effective amount of a co-intensifier selected from the group consisting of an acid soluble bismuth metal salt, an acid soluble antimony metal salt, and mixtures thereof.

23. A method of inhibiting corrosion of a steel surface in contact with an acidic medium, comprising the steps of:

introducing into a corrosion inhibitor an effective amount of an acid soluble mercury metal salt intensifier;

introducing an effective amount of the corrosion inhibitor containing the mercury metal salt intensifier into the acidic medium contacting the steel surface.

24. The method of claim 23 where the corrosion inhibitor containing the mercury metal salt is placed in contact with the steel surface at the same time as the acidic medium.

25. The method of claim 23 where the intensifier is placed into the corrosion inhibitor independent of when the corrosion inhibitor is introduced into contact with the steel surface.

26. The method of claim 23 where the acidic medium is selected from the group consisting of hydrochloric acid, hydrofluoric acid, acetic acid, formic acid, citric acid and mixtures thereof.

27. The method of claim 23 where the steel surface is high alloy steel surface comprising at least about 13% by weight chrome.

28. The method of claim 23 where the steel surface is a high alloy steel surface comprising at least about 22% by weight chrome and at least about 5% by weight nickel.

29. The method of claim 23 where the mercury metal salt intensifier is selected from the group consisting of mercuric chloride, mercuric acetate, mercuric nitrate, mercuric oxides and mixtures thereof.

30. The method of claim 23 further comprising an effective amount of a co-intensifier selected from the group consisting of an acid soluble bismuth metal salt, an acid soluble antimony metal salt, and mixtures thereof.

31. The method of claim 23 where an acid soluble copper metal salt co-intensifier is also present with the mercuric halide.

32. The method of claim 31 where the acid soluble copper metal salt is selected from the group consisting of cuprous chloride, copper acetate, cupric formate and cuprous nitrate, mixtures thereof.

33. The method of claim 31 further comprising an effective amount of a co-intensifier selected from the group consisting of an acid soluble bismuth metal salt, an acid soluble antimony metal salt, and mixtures thereof.

34. A method of treating a subterranean well for enhancement of production within the well, comprising the steps of:

introducing and positioning within the well a high alloy steel surface exposable to a treatment fluid therewith;

introducing into the well and contacting the surface with a treatment fluid comprising an acidic injection medium, an acid corrosion inhibitor, and an intensifier for deposition on or effective treatment contact with the surface, the intensifier comprising an acid soluble mercury metal salt;

circulating the fluid into the well for contact with at least one production zone within the well.

35. The method of claim 34 where the acidic medium is selected from the group consisting of hydrochloric acid, hydrofluoric acid, acetic acid, formic acid, citric acid and mixtures thereof.

36. The method of claim 34 where the acid soluble mercury metal salt intensifier is selected from the group consisting of mercuric chloride, mercuric acetate, mercuric nitrate, mercuric oxides and mixtures thereof.

37. The method of claim 34 further comprising an effective amount of a co-intensifier selected from the group consisting of an acid soluble bismuth metal salt, an acid soluble antimony metal salt, and mixtures thereof.

38. The method of claim 34 where an acid soluble copper metal salt co-intensifier is also present with the mercury intensifier.

39. The method of claim 38 where the acid soluble copper metal salt co-intensifier is selected from the group consisting of cuprous chloride, copper acetate, cupric formate, cuprous nitrate and mixtures thereof.

40. The method of claim 38 further comprising an effective amount of a co-intensifier selected from the group consisting of an acid soluble bismuth metal salt, an acid soluble antimony metal salt, and mixtures thereof.

* * * * *